United States Patent
Van Berkel

(10) Patent No.: US 11,125,657 B2
(45) Date of Patent: Sep. 21, 2021

(54) SAMPLING PROBE

(71) Applicant: UT-BATTELLE, LLC, Oak Ridge, TN (US)

(72) Inventor: Gary Van Berkel, Oak Ridge, TN (US)

(73) Assignee: UT-BATTELLE, LLC, Oakridge, TN (US)

( * ) Notice: Subject to any disclaimer, the term of this patent is extended or adjusted under 35 U.S.C. 154(b) by 325 days.

(21) Appl. No.: 15/883,560

(22) Filed: Jan. 30, 2018

(65) Prior Publication Data
US 2019/0234837 A1    Aug. 1, 2019

(51) Int. Cl.
*G01N 1/20* (2006.01)
*G01N 1/24* (2006.01)
*H01J 49/04* (2006.01)
*G01N 1/22* (2006.01)
*G01N 1/02* (2006.01)

(52) U.S. Cl.
CPC .................. *G01N 1/20* (2013.01); *G01N 1/24* (2013.01); *H01J 49/0431* (2013.01); *G01N 2001/028* (2013.01); *G01N 2001/2285* (2013.01)

(58) Field of Classification Search
CPC ......... G01N 30/7233; G01N 2030/027; G01N 1/20; G01N 1/24; G01N 2001/028; G01N 2001/2285; H01J 49/0027; H01J 49/0431
USPC ........ 73/863.81, 64.56, 864, 864.81, 864.34, 73/863; 436/174, 180, 177, 173, 52, 53;
(Continued)

(56) References Cited

U.S. PATENT DOCUMENTS 3,806,321 A    4/1974 Durrum et al.
5,333,655 A    8/1994 Bergamini et al.
(Continued)

FOREIGN PATENT DOCUMENTS

CN    101652650 A    2/2010
CN    101696916 A    4/2010
(Continued)

OTHER PUBLICATIONS

International Search Report dated Apr. 24, 2019 in PCT/US19/15894.
(Continued)

*Primary Examiner* — John Fitzgerald
*Assistant Examiner* — Truong D Phan
(74) *Attorney, Agent, or Firm* — Fox Rothschild LLP

(57) ABSTRACT

A system for sampling a surface includes a sampling probe including a housing with a probe end having a sampling fluid opening, a sampling fluid supply conduit and a sampling fluid exhaust conduit. The sampling fluid supply conduit supplies sampling fluid to the sampling fluid opening. The sampling fluid exhaust conduit includes a wall, a sampling fluid exhaust conduit inlet opening for removing sampling fluid from the sampling fluid opening, and a sampling fluid exhaust conduit outlet opening for removing fluid from the sampling fluid exhaust conduit. A sampling fluid analytic conduit is also provided in the sampling probe and has a sampling fluid analytic conduit inlet opening spaced upstream from the sampling fluid exhaust conduit outlet opening, downstream from the sampling fluid exhaust conduit inlet opening, and from the wall of the sampling fluid exhaust conduit. A wash conduit can also be provided. Methods for sampling are also disclosed.

17 Claims, 12 Drawing Sheets

(58) Field of Classification Search
USPC ..... 239/416.4, 416.5, 423; 422/68.1, 83, 63, 422/81, 82, 500, 501, 509, 510, 521
See application file for complete search history.

(56) References Cited

U.S. PATENT DOCUMENTS

| | | | |
|---|---|---|---|
| 5,536,471 | A | 7/1996 | Clark et al. |
| 5,736,740 | A * | 4/1998 | Franzen ............... H01J 49/0404 250/282 |
| 5,783,938 | A | 7/1998 | Munson et al. |
| 5,935,051 | A | 8/1999 | Bell |
| 6,260,407 | B1 | 7/2001 | Petro et al. |
| 6,290,863 | B1 | 9/2001 | Morgan et al. |
| 6,478,238 | B1 * | 11/2002 | Wachs ................... B01L 3/0268 239/338 |
| 6,677,593 | B1 | 1/2004 | Van Berkel |
| 6,784,439 | B2 * | 8/2004 | Van Berkel ............. H01J 49/04 250/281 |
| 6,803,566 | B2 | 10/2004 | Van Berkel |
| 7,295,026 | B2 | 11/2007 | Van Berkel et al. |
| 7,525,105 | B2 | 4/2009 | Kovtoun |
| 7,995,216 | B2 | 8/2011 | Van Berkel et al. |
| 8,003,937 | B2 | 8/2011 | Kertesz et al. |
| 8,084,735 | B2 | 12/2011 | Kertesz et al. |
| 8,117,929 | B2 | 2/2012 | Van Berkel et al. |
| 8,384,020 | B2 | 2/2013 | Jesse et al. |
| 8,486,703 | B2 * | 7/2013 | Van Berkel ............... G01N 1/32 436/174 |
| 8,519,330 | B2 | 8/2013 | Van Berkel et al. |
| 8,637,813 | B2 | 1/2014 | Van Berkel et al. |
| 8,742,338 | B2 | 6/2014 | Van Berkel et al. |
| 9,063,047 | B2 | 6/2015 | Van Berkel et al. |
| 9,064,680 | B2 | 6/2015 | Van Berkel |
| 9,140,633 | B2 | 9/2015 | Van Berkel et al. |
| 9,153,425 | B2 | 10/2015 | Van Berkel |
| 9,176,028 | B2 | 11/2015 | Elnaggar et al. |
| 9,297,828 | B2 | 3/2016 | Ovchinnikova et al. |
| 9,390,901 | B2 | 7/2016 | Kertesz et al. |
| 9,632,066 | B2 * | 4/2017 | Van Berkel ............. A61B 10/02 |
| 2001/0023130 | A1 * | 9/2001 | Gilton ..................... G01N 1/32 438/689 |
| 2003/0193020 | A1 | 10/2003 | Van Berkel |
| 2004/0021068 | A1 | 2/2004 | Staats |
| 2004/0093933 | A1 | 5/2004 | Berger et al. |
| 2004/0149053 | A1 | 8/2004 | Staphanos |
| 2005/0258361 | A1 | 11/2005 | Whitehouse et al. |
| 2007/0259445 | A1 | 11/2007 | Cerda |
| 2008/0128614 | A1 | 6/2008 | Nikolaev et al. |
| 2008/0272294 | A1 | 11/2008 | Kovtoun |
| 2009/0101814 | A1 * | 4/2009 | Amirav ............... H01J 49/0431 250/288 |
| 2009/0140137 | A1 | 6/2009 | Hiraoka et al. |
| 2010/0002905 | A1 | 1/2010 | Van Berkel et al. |
| 2010/0019140 | A1 | 1/2010 | Amirav et al. |
| 2010/0224013 | A1 | 9/2010 | Van Berkel et al. |
| 2011/0036453 | A1 | 2/2011 | Ardenkjaer-larsen et al. |
| 2011/0167898 | A1 | 7/2011 | Zhou et al. |
| 2011/0198495 | A1 | 8/2011 | Hiraoka |
| 2011/0284735 | A1 | 11/2011 | Van Berkel et al. |
| 2012/0053065 | A1 | 3/2012 | Van Berkel |
| 2012/0079894 | A1 | 4/2012 | Van Berkel et al. |
| 2012/0083045 | A1 | 4/2012 | Van Berkel et al. |
| 2014/0096624 | A1 | 4/2014 | Einaggar et al. |
| 2014/0216177 | A1 | 8/2014 | Van Berkel et al. |
| 2014/0238155 | A1 | 8/2014 | Van Berkel et al. |
| 2015/0226710 | A1 | 8/2015 | Hochgraeber |
| 2016/0126080 | A1 | 5/2016 | Kertesz et al. |
| 2016/0299041 | A1 | 10/2016 | Kertesz et al. |
| 2016/0299109 | A1 * | 10/2016 | Van Berkel ............. A61B 10/02 |
| 2017/0315026 | A1 * | 11/2017 | Andreussi ................ G01F 1/40 |
| 2017/0316926 | A1 * | 11/2017 | Arnold ................ H01J 49/0459 |
| 2020/0043712 | A1 * | 2/2020 | Arnold .................. H01J 49/165 |

FOREIGN PATENT DOCUMENTS

| | | |
|---|---|---|
| CN | 102414778 A | 4/2012 |
| CN | 102759466 | 10/2012 |
| CN | 102759466 A | 10/2012 |
| CN | 104165778 A | 11/2014 |
| EP | 0898977 A2 | 3/1999 |
| EP | 1623204 A1 | 2/2006 |
| EP | 1909090 A2 | 4/2008 |
| JP | 2004340646 A | 12/2004 |
| JP | 2011210734 A | 10/2011 |
| JP | 2011232180 A | 11/2011 |
| JP | 2012-519847 A | 8/2012 |
| JP | 2013526700 A | 6/2013 |
| WO | 2011140492 | 10/2011 |

OTHER PUBLICATIONS

International Search Report and Written Opinion dated Aug. 11, 2016 for International Patent Application No. PCT/US16/26709.

Extended European Search Report dated Nov. 13, 2018 in EP 1677385.2.

Ovchinnikova et al.: "Transmission geometry laser ablation into a non-contact liquid vortex capture probe for mass spectrometry imaging", Rapid Commun. Mass Spectrom. 2014, 28, 1665-1673.

International Search Report dated Jul. 1, 2016 in PCT/US2016/026706.

Gary J. Van Berkel et al: "An open port sampling interface for liquid introduction atmospheric pressure ionization mass spectrometry: Open port sampling interface", Rapid Communications in Mass Spectrometry., vol. 29, No. 19, Oct. 15, 2015 (Oct. 15, 2015), pp. 1749-1756.

Extended European Search Report dated Nov. 7, 2018 in 16777383.7.

Tycova et al: "Capillary electrophoresis in an extended nanospray tip-electrosprayas an electrophoretic column", J. Chromatogr. A 1388 (2015) 274-279.

Liu et al: "A Falling Drop for Sample Injection in Capillary Zone Electrophoresis", Anal. Chem. Mar. 1997, vol. 69, 1211-1216.

* cited by examiner

SAMPLING PROBE

STATEMENT REGARDING FEDERALLY SPONSORED RESEARCH

This invention was made with government support under contract no. DE-AC05-00OR22725 awarded by the US Department of Energy. The government has certain rights in this invention.

FIELD OF THE INVENTION

The present invention relates to sampling probes for mass spectrometry, and more particularly to liquid extraction sampling probes for mass spectrometry and other analytic techniques.

BACKGROUND OF THE INVENTION

Liquid extraction sampling probes for mass spectrometry are used as a means for directing solvent to a probe end to collect sample, whether by the sample moving into the solvent such as in a droplet, in the form of an aerosol from for example a laser ablation, or a liquid or solid material on a support like a solid phase extraction affinity material or the solvent flowing to contact the surface of the sample material, suspending sample material in the solvent, and directing this suspended sample material to a mass spectrometry device or other analytical device. Examples of such probes can be found in U.S. Pat. Nos. 6,803,566, 6,784,439, 8,519,330, 6,677,593, 9,063,047, 8,486,703, 8,384,020, 7,295,026, 8,637,813, 8,117,929, 9,153,425, 7,995,216, 9,064,680, 8,003,937, 9,140,633, 9,176,028, 9,390,901, 8,084,735, 9,632,066, 9,297,828, 8,084,735, and US20160299041. The disclosures of these references are incorporated fully by reference.

Prior sampling probes are usually fixed in orientation. Use of such probes in other orientations than the preferred fixed position or in varying positions from that fixed position during operation can lead to loss of liquid from the sampling end of the probe and degrade of sampling results or negatively affect the subject being sampled. Also, such probes had have fixed solvent supply and solvent exhaust conduits, which do not allow for flexibility in the orientation, extension and retraction, and also do not allow for use at extended distances from the mass spectrometer with near real-time reporting capability.

SUMMARY OF THE INVENTION

A sampling system includes a sampling probe including a housing. The housing has a probe end with a sampling fluid opening, a sampling fluid supply conduit and a sampling fluid exhaust conduit. The sampling fluid supply conduit supplies sampling fluid to the sampling fluid opening. The sampling fluid exhaust conduit comprising a wall, a sampling fluid exhaust conduit inlet opening for removing sampling fluid from the sampling fluid opening, and a sampling fluid exhaust conduit outlet opening for removing fluid from the sampling fluid exhaust conduit.

A sampling fluid analytic conduit includes a sampling fluid analytic conduit inlet opening spaced upstream from the sampling fluid exhaust conduit outlet opening, downstream from the sampling fluid exhaust conduit inlet opening, and from the wall. Fluid flowing through the sampling fluid exhaust conduit has a flow axis at the sampling fluid analytic conduit inlet opening that is parallel to a flow axis of fluid flowing through the sampling fluid analytic conduit inlet opening. The sampling fluid analytic conduit inlet opening is spaced from the wall of the sampling fluid exhaust conduit.

The system further includes at least one pump for continuously moving sampling fluid through the sampling fluid supply conduit to the sampling fluid opening, and through the sampling fluid exhaust conduit. At least one analytic conduit pump is provided for moving sampling fluid through the sampling fluid analytic conduit. A portion of the sampling fluid exits the sampling fluid opening to contact the sample and returns to the sampling fluid exhaust opening. A portion of the sampling fluid exits the sampling fluid opening to wash the probe end. A portion of the sampling fluid exits the probe through the sampling fluid analytic conduit.

The volumetric flow rate of sampling fluid through the sampling fluid analytic conduit can be from 0.0001% to 100% of the volumetric flow rate of sampling fluid through the sampling fluid exhaust conduit. The sampling fluid analytic conduit and the sampling fluid exhaust conduit have an inside diameter, and the inside diameter of the sampling fluid analytic conduit is from 0.2% to 100 of the inside diameter of the sampling fluid exhaust conduit. The plug width of sampling fluid flowing through the sampling fluid analytic conduit is from 0.2% to 100% or more of the plug width of sampling fluid flowing through the sampling fluid exhaust conduit.

The relationship between the volumetric flow rate of sampling fluid flowing through the sampling fluid exhaust conduit ($VF_E$), the volumetric flow rate of sampling fluid flowing through the sampling fluid analytic conduit ($VF_A$), the inside diameter of the sampling fluid exhaust conduit ($D_E$), and the inside diameter of the sampling fluid analytic conduit ($D_A$) is:

$$D_A = D_E \sqrt{VF_A/VF_{EA}}$$

The system can further include a wash fluid collection conduit. The wash fluid collection conduit can have a wash fluid inlet opening and a wash fluid outlet opening. A portion of the sampling fluid overflows the probe end and enters the wash fluid collection conduit. The overflowing sampling fluid washes the distal end of at least one of the sampling fluid supply conduit and the sampling fluid exhaust conduit. There can be at least one pump to move sampling fluid through the wash fluid collection conduit and out of the wash fluid outlet opening. The system can further include a heater for heating the wash fluid collection conduit to prevent the formation of condensation on exterior walls of the wash fluid collection conduit.

The sampling fluid supply conduit and the sampling fluid exhaust conduit can be coaxial. The sampling fluid exhaust conduit and the sampling fluid analytic conduit can be coaxial. The sampling fluid supply conduit and the sampling fluid exhaust conduit can be co-linear. The sampling fluid supply conduit and the sampling fluid exhaust conduit can be acute. The sampling fluid supply conduit and the sampling fluid exhaust conduit can be transverse.

The sampling fluid analytic conduit can be in fluid communication with a sampling fluid analytic pump. The sampling fluid analytic conduit can include a non-conductive outlet portion. The non-conductive outlet portion can include an electrode for applying a voltage from a voltage source to sampling fluid flowing through the outlet portion. The system can further include a conductive electrospray entrance. The electrospray entrance can include an electrode for applying a voltage from a voltage source to the electrospray electrode.

A system for sampling includes a sampling probe. The sampling probe includes a housing. The housing can have a probe end with a sampling fluid opening. A sampling fluid supply conduit can have a distal end and a sampling fluid exhaust conduit can have a distal end. The sampling fluid supply conduit supplies sampling fluid to the sampling fluid opening. The sampling fluid exhaust conduit has a sampling fluid exhaust conduit inlet opening for removing sampling fluid from the sampling fluid opening and an exhaust conduit outlet opening for removing sampling fluid from the sampling fluid exhaust conduit. A wash fluid collection conduit can have a wash fluid inlet opening and a wash fluid outlet opening. A portion of the sampling fluid overflows the sample fluid exhaust conduit and enters the wash fluid collection conduit. The overflowing sampling fluid washes the distal end of at least one of the sampling fluid supply conduit and the sampling fluid exhaust conduit. The system can further include at least one pump for continuously moving a portion of the sampling fluid exiting the sampling fluid opening to contact the sample and returning to the sampling fluid exhaust opening, for moving a portion of the sampling fluid exiting the sampling fluid opening to wash the probe end, for moving a portion of the sampling fluid exiting the probe through the sampling fluid exhaust conduit, and for moving sampling fluid through the wash fluid collection conduit and out of the wash fluid outlet opening.

The system can further include a sampling fluid analytic conduit. The sampling fluid analytic conduit has an analytic fluid conduit inlet opening spaced downstream from the sampling fluid exhaust conduit inlet opening, upstream from the sampling fluid exhaust conduit outlet opening, and spaced from the wall. Fluid flowing through the sampling fluid exhaust conduit can have a flow axis at the sampling fluid analytic conduit inlet opening that is parallel to a flow axis of fluid flowing through the sampling fluid analytic conduit inlet opening. The sampling fluid analytic conduit inlet opening can be spaced from the wall of the sampling fluid exhaust conduit. The system can further include at least one pump for continuously moving sampling fluid through the sampling fluid supply conduit to the sampling fluid opening, through the sampling fluid exhaust conduit, and a sampling fluid analytic pump for moving sampling fluid through the sampling fluid analytic conduit. A portion of the sampling fluid exits the sampling fluid opening to contact the surface and returns to the sampling fluid exhaust opening. A portion of the sampling fluid exits the sampling fluid opening to wash the probe end and enters the wash fluid collection conduit. A portion of the sampling fluid exits the probe through the sampling fluid analytic conduit.

A method for sampling includes the step of providing a sampling probe comprising a housing having a probe end with a sampling fluid opening, a sampling fluid supply conduit and a sampling fluid exhaust conduit. The sampling fluid supply conduit supplies sampling fluid to the sampling fluid opening. The sampling fluid exhaust conduit includes a wall and a sampling fluid exhaust conduit inlet opening for removing sampling fluid from the sampling fluid opening and a sampling fluid exhaust conduit outlet opening for removing sampling fluid from the sampling fluid exhaust conduit. A sampling fluid analytic conduit includes a sampling fluid analytic conduit inlet opening spaced upstream from the sampling fluid exhaust conduit outlet opening and downstream from the sampling fluid exhaust conduit inlet opening. Fluid flowing through the sampling fluid exhaust conduit has a flow axis at the sampling fluid analytic conduit inlet opening that is parallel to a flow axis of fluid flowing through the sampling fluid analytic conduit inlet opening. The sampling fluid analytic conduit inlet opening is being spaced from the wall of the sampling fluid exhaust conduit.

The method further includes the step of moving sampling fluid through the sampling fluid supply conduit to the sampling fluid opening, through the sampling fluid exhaust conduit, and the sampling fluid analytic conduit. A portion of the sampling fluid exits the sampling fluid opening to contact the sample and returns to the sampling fluid exhaust opening. A portion of the sampling fluid exits the sampling fluid opening to wash the probe end. A portion of the sampling fluid exits the probe through the sampling fluid analytic conduit. The sampling fluid flowing through the sampling fluid analytic conduit can be isokinetic with the sampling fluid flowing though the sampling fluid exhaust conduit.

A method for sampling can include step of providing a sampling probe comprising a housing having a probe end with a sampling fluid opening. A sampling fluid supply conduit has a distal end and a sampling fluid exhaust conduit has a distal end. The sampling fluid supply conduit supplies sampling fluid to the sampling fluid opening. The sampling fluid exhaust conduit has a sampling fluid exhaust opening for removing sampling fluid from the sampling fluid opening. The probe further includes a wash fluid collection conduit. The wash fluid collection conduit has a wash fluid inlet opening and a wash fluid outlet opening. A portion of the sampling fluid overflows the sample fluid exhaust conduit and enters the wash fluid collection conduit. The overflowing sampling fluid washes the distal end of at least one of the sampling fluid supply conduit and the sampling fluid exhaust conduit. The method further includes the step of moving sampling fluid through the sampling fluid supply conduit to the sampling fluid opening. A portion of the sampling fluid exits the sampling fluid opening to contact the sample and returns to the sampling fluid exhaust opening and flows through the sampling fluid exhaust conduit. A portion of the sampling fluid exits the sampling fluid opening to wash the probe end and flows through the wash fluid collection conduit and out of the wash fluid outlet opening.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1A:
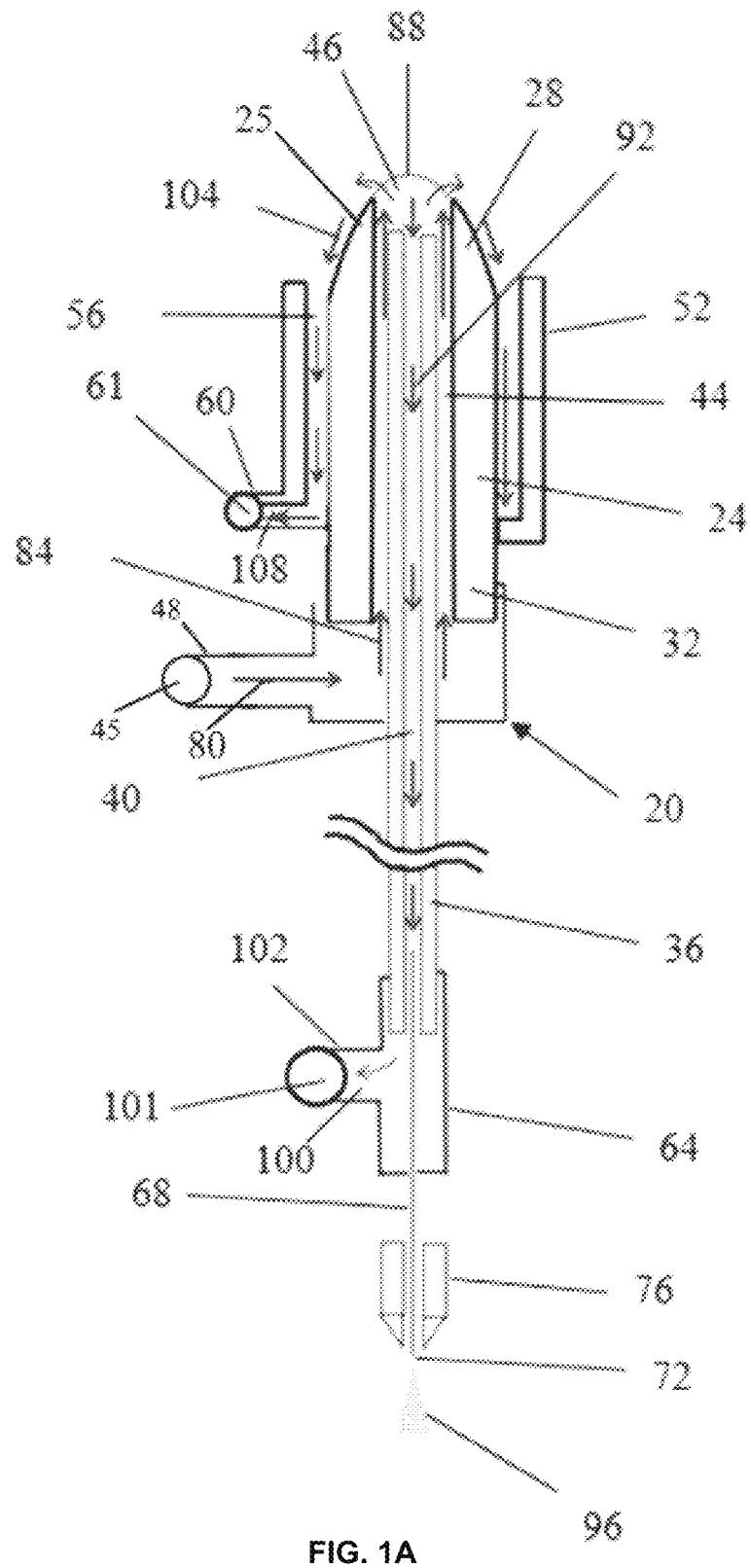
FIG. 1A is a schematic diagram of a system for sampling including a probe.

A system for sampling in the present invention includes a sampling probe including a housing. The housing has a probe end with a sampling fluid opening, a sampling fluid supply conduit and a sampling fluid exhaust conduit. The sampling fluid supply conduit supplies sampling fluid to the sampling fluid opening. The sampling fluid exhaust conduit includes a wall, a sampling fluid exhaust conduit inlet opening for removing sampling fluid from the sampling fluid opening, and a sampling fluid exhaust conduit outlet opening for removing fluid from the sampling fluid exhaust conduit.

A sampling fluid analytic conduit is also provided in the sampling probe and has a sampling fluid analytic conduit inlet opening spaced upstream from the sampling fluid exhaust conduit outlet opening, downstream from the sampling fluid exhaust conduit inlet opening, and from the wall of the sampling fluid exhaust conduit. Fluid flowing through the sampling fluid exhaust conduit has a flow axis at the sampling fluid analytic conduit inlet opening that is parallel to a flow axis of fluid flowing through the sampling fluid analytic conduit inlet opening. The sampling fluid analytic conduit inlet opening is spaced from the wall of the sampling fluid exhaust conduit to avoid wall effects.

The system for sampling can further include at least one pump for continuously moving sampling fluid through the sampling fluid supply conduit to the sampling fluid opening, through the sampling fluid exhaust conduit, and the sampling fluid analytic conduit. A portion of the sampling fluid exits the sampling fluid opening to contact the sample and returns to the sampling fluid exhaust opening. A portion of the sampling fluid can exit the sampling fluid opening to wash the probe end. Another portion of the sampling fluid can exit the probe through the sampling fluid analytic conduit.

The volumetric flow rate of sampling fluid through the sampling fluid analytic conduit can be from 0.0001% to 100% of the volumetric flow rate of sampling fluid through the sampling fluid exhaust conduit.

The sampling fluid analytic conduit and the sampling fluid exhaust conduit have an inside diameter. The inside diameter of the sampling fluid analytic conduit is from 0.2% to 100% of the inside diameter of the sampling fluid exhaust conduit.

The plug width of sampling fluid flowing through the sampling fluid analytic conduit can be from 0.2% to 100% of the plug width of sampling fluid flowing through the sampling fluid exhaust conduit. In the case where the linear flow velocity in the analytic conduit is greater than the linear flow velocity in the exhaust conduit the plug width in the analytic conduit can be greater than the plug width in the exhaust conduit.

The relationship between the volumetric flow rate of sampling fluid flowing through the sampling fluid exhaust conduit ($VF_E$), the volumetric flow rate of sampling fluid flowing through the sampling fluid analytic conduit ($VF_A$), the inside diameter of the sampling fluid exhaust conduit ($D_E$), and the inside diameter of the sampling fluid analytic conduit ($D_A$) is:

$$D_A = D_E \sqrt{VF_A/VF_E}$$

In the case of isokinetic flow the linear flow velocities in the two conduits are the same, but the volumetric flow rates are not the same unless the inside diameter of the two conduits is the same.

The system can further include a wash fluid collection conduit. The wash fluid collection conduit can have a wash fluid inlet opening and a wash fluid outlet opening. A portion of the sampling fluid overflows the probe end and enters the wash fluid collection conduit. The overflowing sampling fluid washes the distal end of at least one of the sampling fluid supply conduit and the sampling fluid exhaust conduit and enters the wash fluid collection conduit. The pump moves sampling fluid through the wash fluid collection conduit and out of the wash fluid outlet opening. The system can further include a heater for heating components of the wash fluid collection conduit to counter evaporative cooling effects so as to inhibit condensation of ambient atmospheric vapors or solvent vapors from the sampling fluid on the external surfaces of the device.

The orientation between the sampling fluid supply conduit and the sampling fluid exhaust conduit can take many different forms. In one embodiment, the orientation between the sampling fluid supply conduit and the sampling fluid exhaust conduit can be coaxial. The orientation between the sampling fluid exhaust conduit and the sampling fluid analytic conduit can be coaxial. The orientation between the sampling fluid supply conduit and the sampling fluid exhaust conduit can be co-linear. The orientation between the sampling fluid supply conduit and the sampling fluid exhaust conduit can be acute. The sampling fluid supply conduit and the sampling fluid exhaust conduit can be transverse.

The solvent fluid analytic conduit can be in fluid communication with a flexible exhaust fluid conduit made of any number of materials including stainless steel (with proper grounding), fused silica, Telfon or other fluorinated polymer material, polyether ether ketone (PEEK), or PEEK encapsulated fused silica. The flexible exhaust fluid conduit can be extremely short (millimeters to centimeters) or of significant length being a meter or more in length. The flexible exhaust fluid conduit extends into the probe housing as shown. It is also possible to have an exhaust fluid conduit in the probe housing, which need not be flexible, in fluid communication with an exhaust fluid conduit extending out of the probe housing. Such fluid communication linkages are preferably avoided, and accordingly in the embodiment shown the flexible exhaust fluid conduit extends into the probe housing.

The sampling fluid analytic conduit can include a non-conductive outlet portion. The non-conductive outlet portion can include an electrode for applying a voltage from a voltage source to sampling fluid flowing through the outlet portion. The system can further include a conductive electrospray entrance. The electrospray entrance can include an electrode for applying a voltage from a voltage source to the electrospray electrode and fluid flowing therein.

A system for sampling can include a sampling probe including a housing. The housing can have a probe end with a sampling fluid opening, a sampling fluid supply conduit having a distal end and a sampling fluid exhaust conduit having a distal end. The sampling fluid supply conduit supplies sampling fluid to the sampling fluid opening. The sampling fluid exhaust conduit has a sampling fluid exhaust conduit inlet opening for removing sampling fluid from the sampling fluid opening and a sampling fluid exhaust conduit outlet opening for removing sampling fluid from the sampling fluid exhaust conduit. A wash fluid collection conduit can have a wash fluid inlet opening and a wash fluid outlet opening. A portion of the sampling fluid overflows the sample fluid exhaust conduit and enters the wash fluid collection conduit. The overflowing sampling fluid washes the distal end of at least one of the sampling fluid supply conduit and the sampling fluid exhaust conduit.

The system can further include at least one pump for continuously moving a portion of the sampling fluid exiting the sampling fluid opening to contact the sample and returning to the sampling fluid exhaust opening, for moving a portion of the sampling fluid exiting the sampling fluid opening to wash the probe end, for moving a portion of the sampling fluid exiting the probe through the sampling fluid exhaust conduit. A pump can also be provided for moving sampling fluid through the wash fluid collection conduit and out of the wash fluid outlet opening. Sampling fluid will usually enter the probe under the pressure of an external sampling fluid source, however, a pump can be provided to meter and control the pressure of the sampling fluid entering the probe.

The system for sampling including a wash conduit an further include a sampling fluid analytic conduit. The sampling fluid analytic conduit can have an analytic fluid conduit inlet opening spaced downstream from the sampling fluid exhaust conduit inlet opening, upstream from the sampling fluid exhaust conduit outlet opening, and spaced from the wall. Fluid flowing through the sampling fluid exhaust conduit can have a flow axis at the sampling fluid analytic conduit inlet opening that is parallel to a flow axis of fluid flowing through the sampling fluid analytic conduit inlet opening. The sampling fluid analytic conduit inlet opening can be spaced from the wall of the sampling fluid exhaust conduit to avoid wall effects.

At least one pump or solvent source supply pressure can continuously move sampling fluid through the sampling fluid supply conduit to the sampling fluid opening, and a separate pump can be provided to move the sampling fluid through the sampling fluid exhaust conduit or a pump in the system can be set up to pump more than one conduit. A pump is provided for moving fluid through the sampling fluid analytic conduit. Still another pump can be provided to move fluid through the wash conduit, if a wash conduit is provided. A portion of the sampling fluid exits the sampling fluid opening to contact the sample and returning to the sampling fluid exhaust conduit inlet opening. A portion of the sampling fluid exits the probe through the sampling fluid analytic conduit. Another portion of the sampling fluid exits the probe through the sampling fluid exhaust conduit outlet opening A remaining portion of the sampling fluid exits the sampling fluid opening to wash the probe end and enters the wash fluid collection conduit.

A method for sampling can include the step of providing a sampling probe comprising a housing having a probe end with a sampling fluid opening, a sampling fluid supply conduit and a sampling fluid exhaust conduit. The sampling fluid supply conduit supplies sampling fluid to the sampling fluid opening. The sampling fluid exhaust conduit can include a wall and a sampling fluid exhaust conduit inlet opening for removing sampling fluid from the sampling fluid opening and a sampling fluid exhaust conduit outlet opening for removing sampling fluid from the sampling fluid exhaust conduit.

A sampling fluid analytic conduit can have a sampling fluid analytic conduit inlet opening spaced upstream from the sampling fluid exhaust conduit outlet opening and downstream from the sampling fluid exhaust conduit inlet opening. Fluid flowing through the sampling fluid exhaust conduit can have a flow axis at the sampling fluid analytic conduit inlet opening that is parallel to a flow axis of fluid flowing through the sampling fluid analytic conduit inlet opening. The sampling fluid analytic conduit inlet opening can be spaced from the wall of the sampling fluid exhaust conduit.

The method can further include the step of moving sampling fluid through the sampling fluid supply conduit to the sampling fluid opening, through the sampling fluid exhaust conduit, and the sampling fluid analytic conduit. A portion of the sampling fluid exits the sampling fluid opening to contact the sample and returning to the sampling fluid exhaust opening. A portion of the sampling fluid exits the sampling fluid opening to wash the probe end. Another portion of the sampling fluid exits the probe through the sampling fluid analytic conduit. Sampling fluid flowing through the sampling fluid analytic conduit can be isokinetic with the sampling fluid flowing though the sampling fluid exhaust conduit.

A method for sampling can include the step of providing a sampling probe comprising a housing. The housing can have a probe end with a sampling fluid opening, a sampling fluid supply conduit having a distal end and a sampling fluid exhaust conduit having a distal end. The sampling fluid supply conduit supplies sampling fluid to the sampling fluid opening. The sampling fluid exhaust conduit has a sampling fluid exhaust opening for removing sampling fluid from the sampling fluid opening. The probe can further include a wash fluid collection conduit. The wash fluid collection conduit can have a wash fluid inlet opening and a wash fluid outlet opening. A portion of the sampling fluid overflows the sample fluid exhaust conduit and enters the wash fluid collection conduit. The overflowing sampling fluid washes the distal end of at least one of the sampling fluid supply conduit and the sampling fluid exhaust conduit.

The method further includes the step of moving sampling fluid through the sampling fluid supply conduit to the sampling fluid opening. A portion of the sampling fluid exits the sampling fluid opening to contact the sample and returns to the sampling fluid exhaust opening and flows through the sampling fluid exhaust conduit. Another portion of the sampling fluid exits the sampling fluid opening to wash the probe end and flows through the wash fluid collection conduit and out of the wash fluid outlet opening.

Figure 1B:
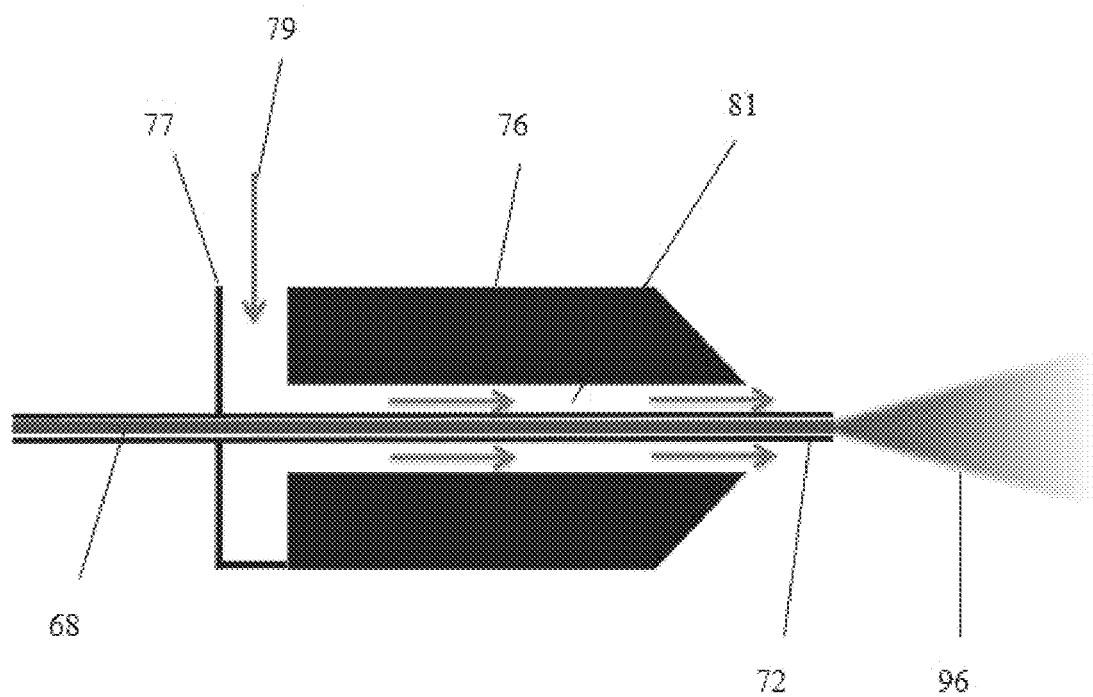
FIG. 1B is a schematic diagram of a spray nozzle from FIG. 1A.
Figure 2:
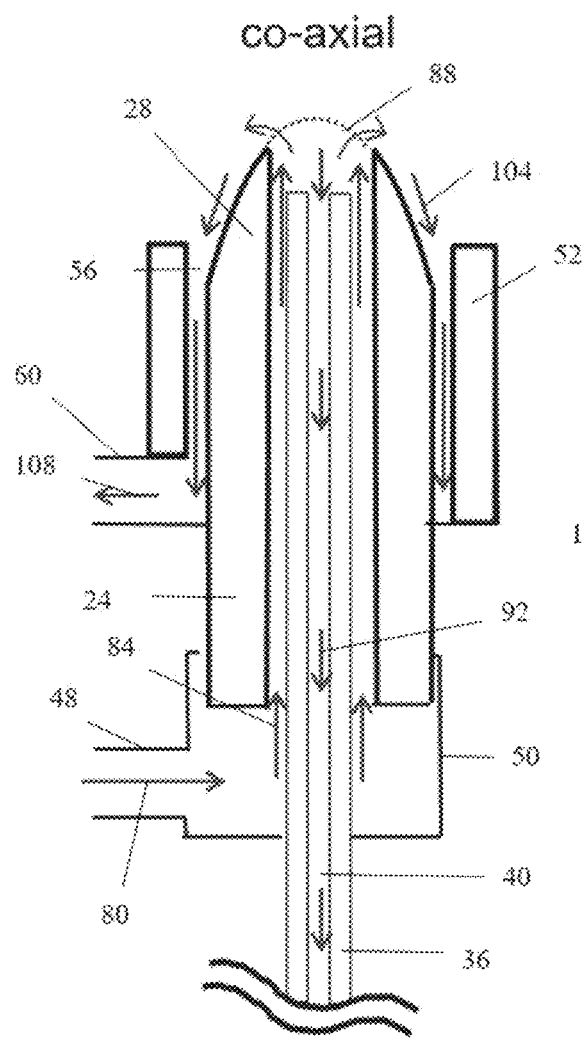
FIG. 2 is a schematic diagram of a probe having co-axial orientation between the sampling fluid supply conduit and the sampling fluid exhaust conduit.

FIGS. 1-2 are schematic diagrams of a system for sampling including a probe. The system includes a sampling probe 20 having a housing 24 with a distal end 28 and a proximal end 32. The housing 24 has a probe end 25 and the housing 24 defines a sampling fluid supply conduit 44 for delivering sampling fluid to a sampling fluid opening 46. A sampling fluid exhaust conduit 36 defining an interior channel 40 can be provided in coaxial relationship with the sampling fluid supply conduit 44. Sampling fluid supply conduit 44 receives sampling fluid through a sampling fluid inlet 48 in an inlet fitting 50. A wash conduit 52 defines a wash fluid channel 56 for receiving sampling fluid overflow from the sampling fluid opening 46. The wash fluid exits through a wash fluid outlet 60.

Figure 6:
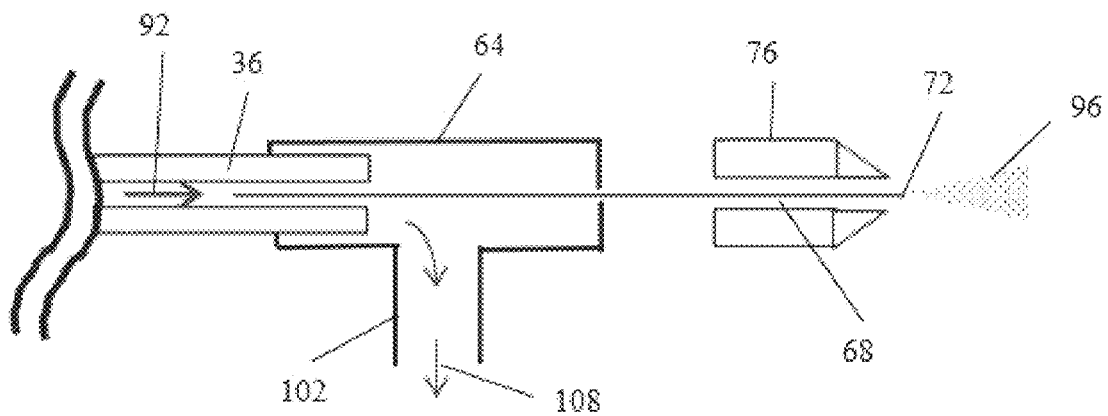
FIG. 6 is a schematic diagram of a proximal end of the system for sampling including a sampling fluid exhaust conduit, a sampling fluid analytic conduit, and a spray nozzle.

A sampling fluid exhaust fitting 64 defines a sampling fluid exhaust outlet 102. A sampling fluid analytic conduit 68 is provided in the flow channel 40 of the sampling fluid exhaust conduit 36. The sampling fluid analytic conduit 68 receives a portion of the sampling fluid flowing through the sampling fluid exhaust conduit 36 and delivers the analytic fluid to an end 72 within a spray nozzle 76 such as a pneumatic nebulization nozzle for subsequent gas phase ionization at atmospheric pressure (FIG. 6). The spray nozzle 76 includes a pump to move sampling fluid through the sampling fluid analytic conduit 68 (FIG. 1B). As shown a nebulization gas 79 can be supplied through gas conduit 77 to the nebulization gas channel 81 where the gas will contact sampling fluid leaving end 72 of the sampling fluid analytic conduit 68 to nebulize the gas and draw sampling fluid through the sampling fluid analytic conduit 68. Any suitable pump can be used, such as a Venturi pump. In known fashion the nebulization nozzle 76 and the fluid analytic conduit 68 can be configured to form a plume of charged droplets or vapor plume 96 for electrospray ionization or another form of atmospheric pressure ionization like atmospheric pressure chemical ionization which can then be redirected to the inlet of a mass spectrometer (not shown).

Fluid flows into the sampling fluid inlet 48 as shown by arrow 80 through pump 45. The sampling fluid then flows through the sampling fluid supply conduit 44 as indicated by arrow 84 and can form an overflow surface 88 as the sampling fluid overflows the distal end 28 of the housing 24. Overflow sampling fluid enters the wash fluid channel 56 as indicated by arrow 104 and thereby washes the distal end 28 of the sampling conduit as well as the distal end of the exhaust conduit 36. Some of the sampling fluid enters the sampling fluid exhaust channel 40 of the sampling fluid exhaust conduit 36 as indicated by arrow 92. Some of the sampling fluid flowing through the sampling fluid exhaust conduit 36 enters the sampling fluid analytic conduit 68. The remainder of the sampling fluid flowing through the sampling fluid exhaust conduit 36 is directed through the outlet opening 102 as indicated by arrow 100 and can be assisted by pump 101. Sampling fluid 104 overflowing the open-end 46 exits the wash fluid outlet 60 as indicated by arrow 108 and can be assisted by pump 61, such as a vacuum pump.

Figure 3:
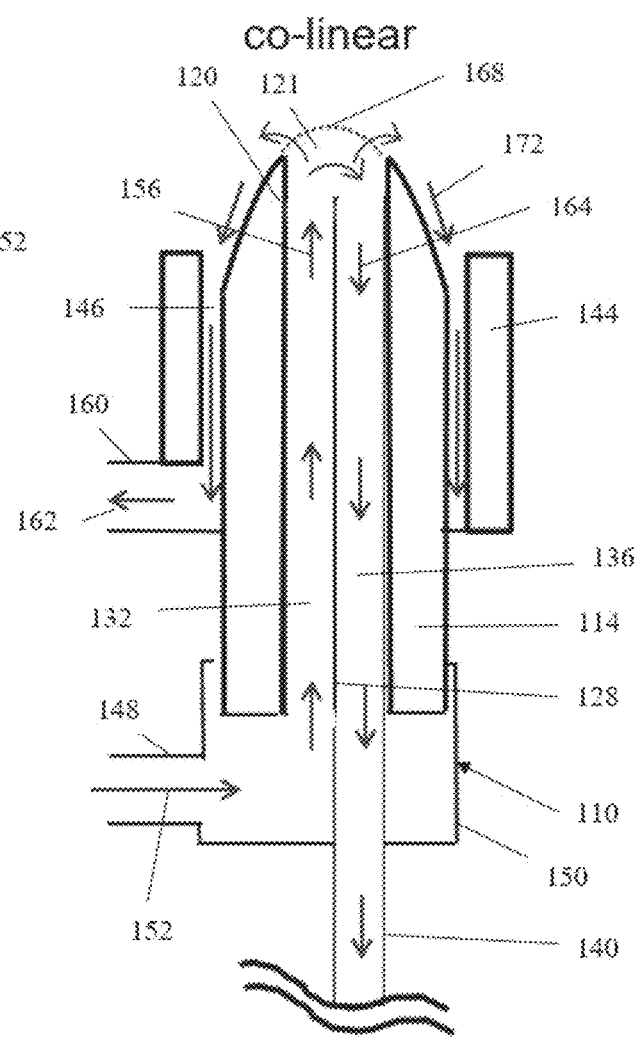
FIG. 3 is a schematic diagram of a probe having co-linear orientation between the sampling fluid supply conduit and the sampling fluid exhaust conduit.

The particular arrangement of the sampling fluid supply conduit, the sampling fluid exhaust conduit, the sampling fluid analytic conduit, and if present the sampling fluid wash conduit can vary. A co-axial relationship of the sampling fluid supply conduit 44 and the sampling fluid exhaust conduit 36 is shown in FIGS. 1-2 and FIG. 6. A probe 110 with a co-linear arrangement is shown in FIG. 3. FIG. 3 is a schematic diagram of a probe having co-linear orientation between the sampling fluid supply conduit and the sampling fluid exhaust conduit. As shown in FIG. 3, the probe 110 includes a housing 114 defining an open interior and having a distal end 120 and a sampling fluid opening 121. A divider 128 divides the open interior into a sampling fluid supply conduit 132 and a sampling fluid exhaust conduit 136. The sampling fluid exhaust conduit 136 extends from the housing 114 as shown by portion 140 which can be a flexible tether. A sampling fluid wash conduit 144 can be provided and defines a sampling fluid wash channel 146. A sampling fluid inlet 148 communicates with an inlet fitting 150 and supplies sampling fluid as indicated by arrow 152. Sampling fluid flows through the sampling fluid supply conduit 132 as indicated by arrow 156. The sampling fluid can form an overflow fluid surface 168 at the sampling fluid opening. Some of the sampling fluid enters the sampling fluid exhaust conduit 136 as indicated by arrow 164. Some of the sampling fluid overflows as indicated by arrow 172 and enters the sampling fluid wash channel 146 and exits through wash channel outlet 160 as indicated by flow arrow 162.

Figures 4, 5:
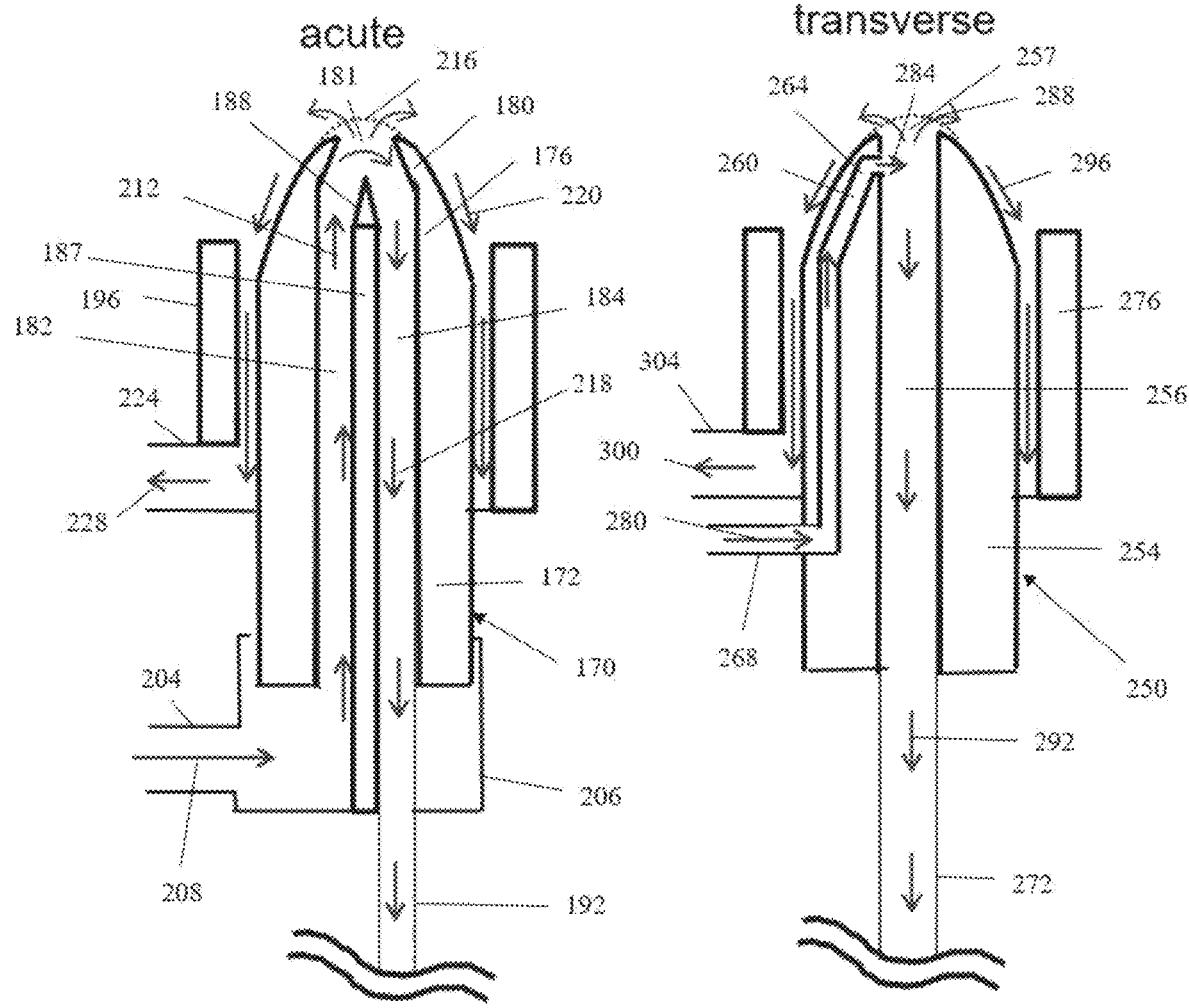
FIG. 4 is a schematic diagram of a probe having an acute orientation between the sampling fluid supply conduit and the sampling fluid exhaust conduit.
FIG. 5 is a schematic diagram of a probe having a transverse orientation between the sampling fluid supply conduit and the sampling fluid exhaust conduit.

FIG. 4 is a schematic diagram of a probe 170 having an acute orientation between the sampling fluid supply conduit and the sampling fluid exhaust conduit. The probe 170 has a housing 172 having a distal end 176 with inwardly and distally angled end flange 180 defining a sample opening 181. The end flange 180 is angled acutely with respect to the housing 172. A flow divider 187 defines a sampling fluid supply conduit 182 and a sampling fluid exhaust conduit 184. The sampling fluid exhaust conduit 184 can extend beyond the probe housing 172, as by for example a flexible tether portion 192. The flow divider 187 can have an angled tip 188 for directing sampling fluid to and from the sampling fluid opening 181. A wash conduit 196 can be provided as previously described with a wash outlet 224. Sampling fluid enters the probe 170 through a sampling fluid inlet 204 of a sample fluid inlet fitting 206 and enters the sampling fluid supply conduit 182 as indicated by arrow 212. The sampling fluid flows to the sampling fluid opening 181 and can form an overflow liquid surface 216. Sampling fluid flows through the sampling fluid exhaust as indicated by flow arrow 218. Sampling fluid can overflow the sample fluid opening 181 as indicated by arrow 220 and enters the wash conduit 196 and exits through wash fluid outlet 224 as indicated by arrow 228.

FIG. 5 is a schematic diagram of a probe 250 having a transverse orientation between the sampling fluid supply conduit and the sampling fluid exhaust conduit. The probe 250 has a housing 254 defining an interior sampling fluid exhaust conduit 256 and a sampling fluid opening 257. A sampling fluid supply conduit 260 has an outlet opening 264 that directs sampling fluid transversely with respect to the sample fluid exhaust conduit 256. The sampling fluid exhaust conduit 256 can extend out of the probe as indicated by flexible portion 272. A wash conduit 276 can be provided. Sampling fluid flows into the sampling fluid supply conduit 260 through a sampling fluid inlet opening 268 as indicated by arrow 280. The sampling fluid is injected transversely with respect to the sampling fluid opening 257 as indicated by arrow 284. An overflow fluid surface 288 can be formed. Sampling fluid exits through the sampling fluid exhaust conduit 256 as indicated by arrow 292. Some of the fluid overflows the sampling fluid opening 257 as indicated by arrow 296 and enters the wash conduit 276 and exits through a wash fluid outlet 304 as indicated by arrow 300.

Figure 7:
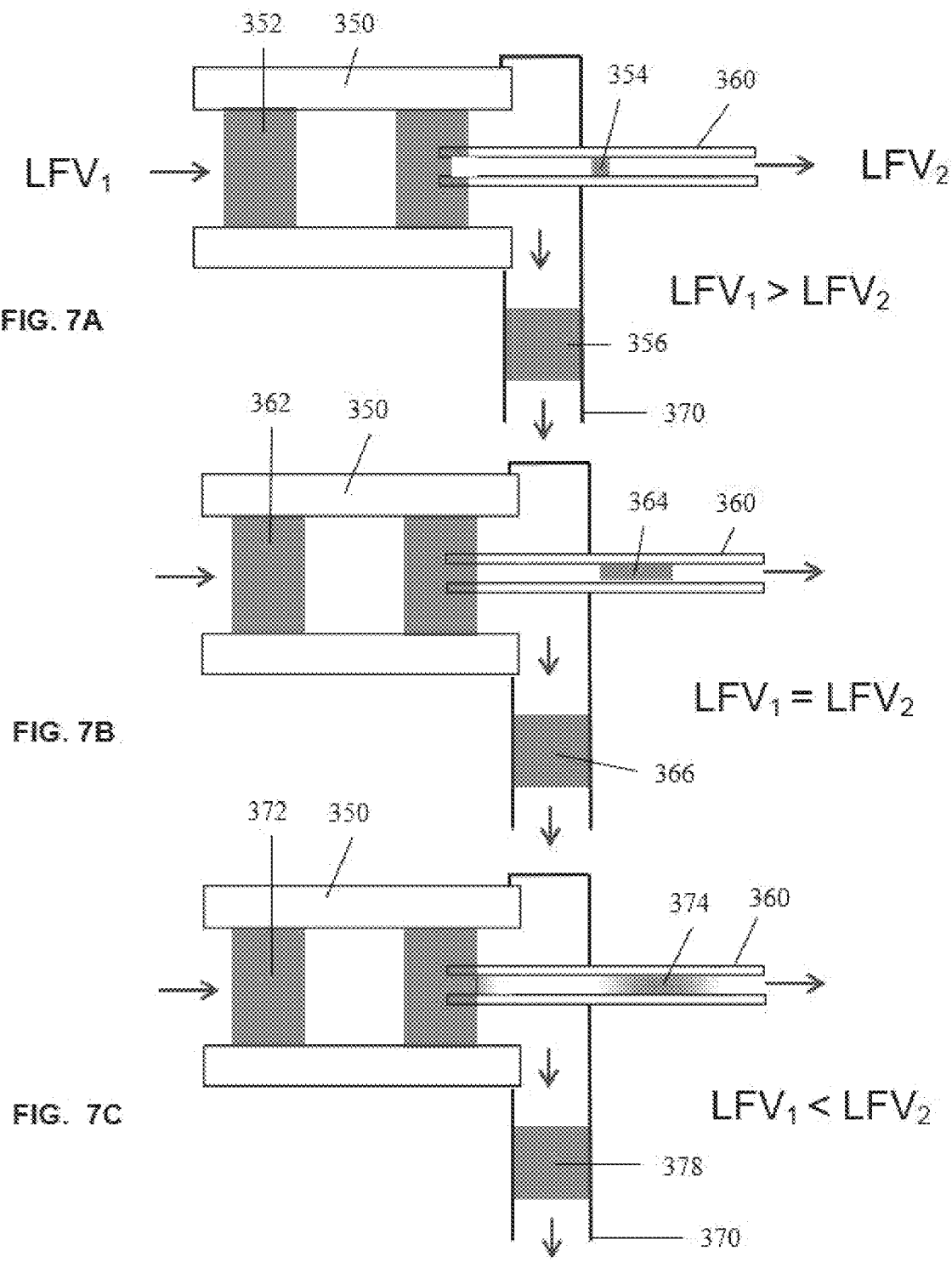
FIGS. 7A, 7B and 7C are schematic diagrams of a sampling fluid exhaust conduit and a sampling fluid analytic conduit where the linear flow velocity (LFV) is $LFV_1 > LFV_2$ (FIG. 7A); $LFV_1 = LFV_2$ (FIG. 7B); and $LFV_1 < LFV_2$ (FIG. 7C).

FIG. 7 is a schematic of a sampling fluid exhaust conduit and a sampling fluid analytic conduit and showing the flow possibilities between the sampling fluid exhaust conduit 350 and the sampling fluid analytic conduit 360. FIG. 7A shows the condition where the linear flow velocity (LFV) in the exhaust conduit 350 ($LFV_1$) is greater than the linear flow velocity in the sampling fluid analytic conduit 360 ($LFV_2$), such that $LFV_1>LFV_2$. The plug 354 in the analytic conduit 360 is shown to be smaller than the plug 352 in the exhaust conduit 350 or the plug 356 in the sampling fluid outlet 370. FIG. 7B shows the condition where the linear flow velocity flow in the exhaust conduit 350 is the same as the linear flow velocity in the analytic conduit 360, or $LFV_1=LFV_2$. The plug 364 in the analytic conduit 360 has an equal plug width to the plug 362 in the exhaust conduit 350 or the plug 366 in the sampling fluid outlet 370. FIG. 7C shows the condition where the linear flow velocity in the analytic conduit 360 is greater than the linear flow velocity in the exhaust conduit 350, or where $LFV1<LFV_2$. The plug 374 in the sampling fluid analytic conduit 360 has a greater plug width than the plug width of the plug 372 in the exhaust conduit 350 or the plug width of the plug 378 in the sampling fluid outlet 370.

Figure 8:
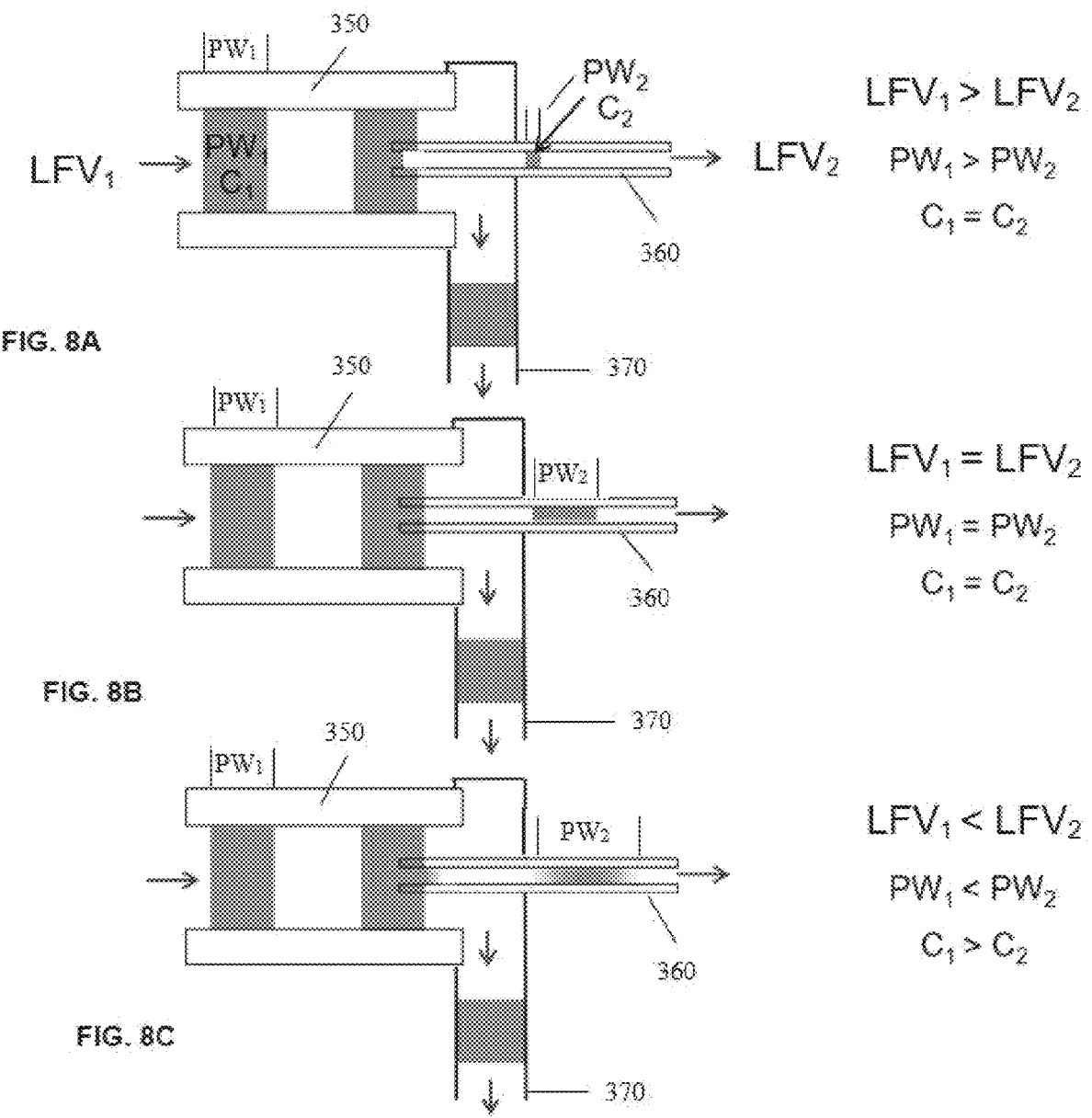
FIGS. 8A, 8B and 8C are schematic diagrams of a sampling fluid exhaust conduit and a sampling fluid analytic conduit with $LFV_1 > LFV_2$, $PW_1 > PW_2$, and $C_1 = C_2$ (FIG. 8A); $LFV_1 = LFV_2$, $PW_1 = PW_2$, and $C_1 = C_2$ (FIG. 8B); and $LFV_1 < LFV_2$, $PW_1 < PW_2$, $C_1 > C_2$ (FIG. 8C).

FIG. 8 is a schematic diagram of fluid flow through the sampling fluid exhaust conduit 350, the sampling fluid analytic conduit 360, and the sampling fluid outlet 370, where LFV is the linear flow velocity, PW is the plug width, and C is the concentration of sample in the sampling fluid. As indicated, FIG. 8A shows the condition where $LFV_1>LFV_2$, $PW_1>PW_2$, and $C_1=C_2$. FIG. 8B shows the condition where $LFV_1=LFV_2$, $PW_1=PW_2$, and $C_1=C_2$. FIG. 8C shows the condition where $LFV_1<LFV_2$, $PW_1<PW_2$, $C_1>C_2$.

Figure 9:
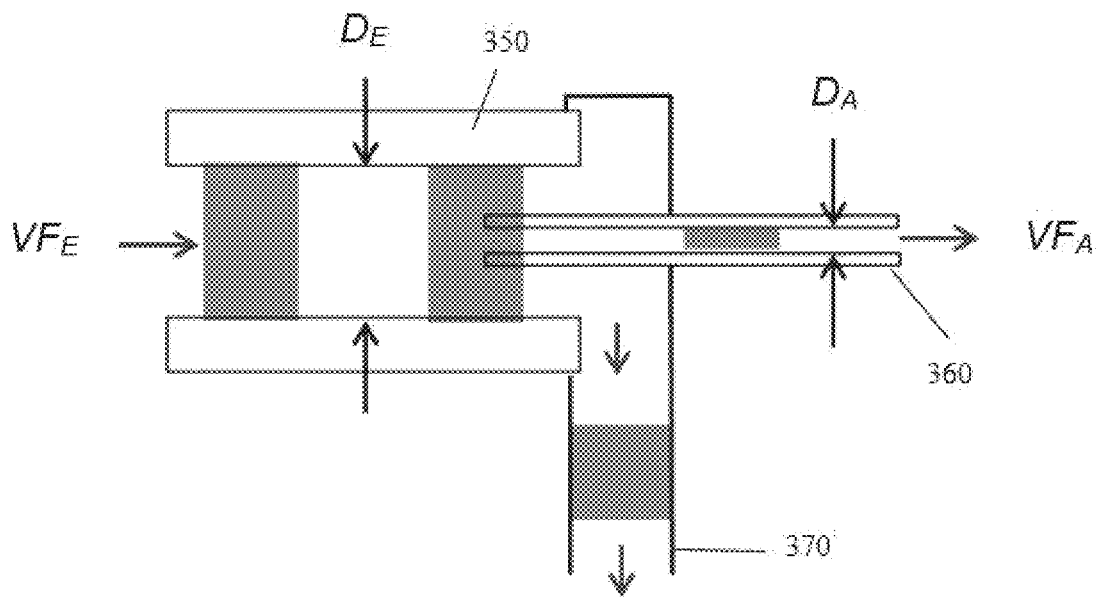
FIG. 9 is a schematic diagram illustrating the calculation for $D_A$ under isokinetic condition (or $D_{iso}$)).

FIG. 9 is a schematic diagram illustrating the calculation for $D_A$ under isokinetic condition, or where $D_A=D_{iso}$. As can be seen $D_A$ is the inner diameter of the sampling conduit within the exhaust conduit, or the sampling fluid analytic conduit under isokinetic flow conditions ($D_A=D_{iso}$). $D_E$ is the inner diameter of the sampling fluid exhaust conduit. $VF_E$ is the volumetric flow through the sampling fluid exhaust conduit and $VF_A$ is the set volumetric flow through the sampling fluid analytic conduit. The relationship is given by:

$$D_{iso}=D_A=D_E\sqrt{VF_A/VF_E}$$

Figure 10:
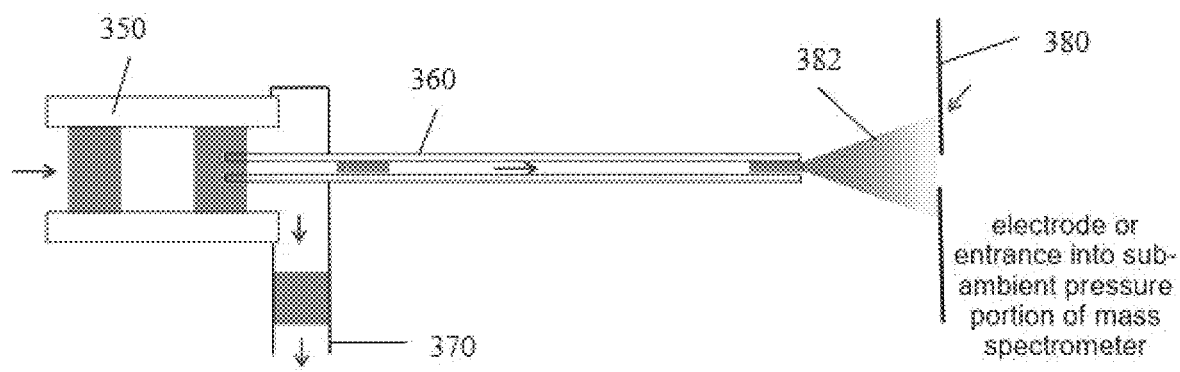
FIG. 10 is a schematic diagram illustrating a system for sampling according to the invention operating in general atmospheric pressure ionization mode.

FIG. 10 is a schematic illustration of a system according to the invention operating in an atmospheric pressure ionization mode. The invention is useful with many different kinds of atmospheric pressure ionization devices, for example electrospray ionization and various forms of atmospheric pressure chemical ionization (APCI). Fluid flows through the sampling fluid exhaust conduit 350 and a portion enters the sampling fluid analytic conduit 360. The remainder of the exhaust sampling fluid exits through outlet 370. A charged droplet or vapor plume 382 is generated at the end of the analytic conduit 360 and travels in the direction of electrode 380. Gas phase ions created in this area by the electrospray process or by gas phase ion molecule reactions with reagent ion such as in corona discharge atmospheric pressure chemical ionization are transferred into a sub ambient pressure portion of the mass spectrometer (not shown).

Figure 11A:
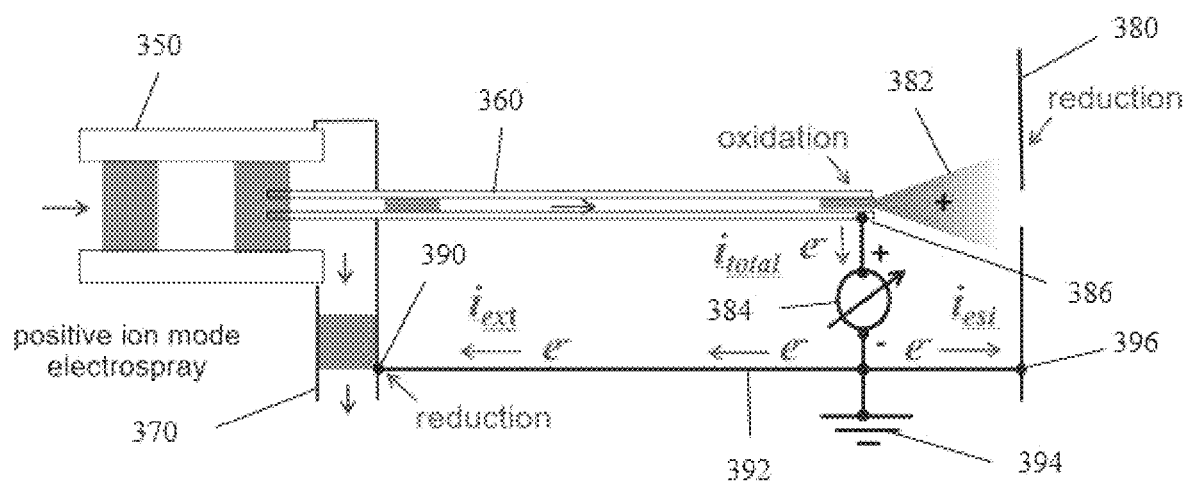
FIGS. 11A and 11B are schematic illustrations of a first circuit connection system according to the invention for a system for sampling operating in positive ion mode electrospray (FIG. 11A) and negative ion mode electrospray (FIG. 11B).
Figure 11B:
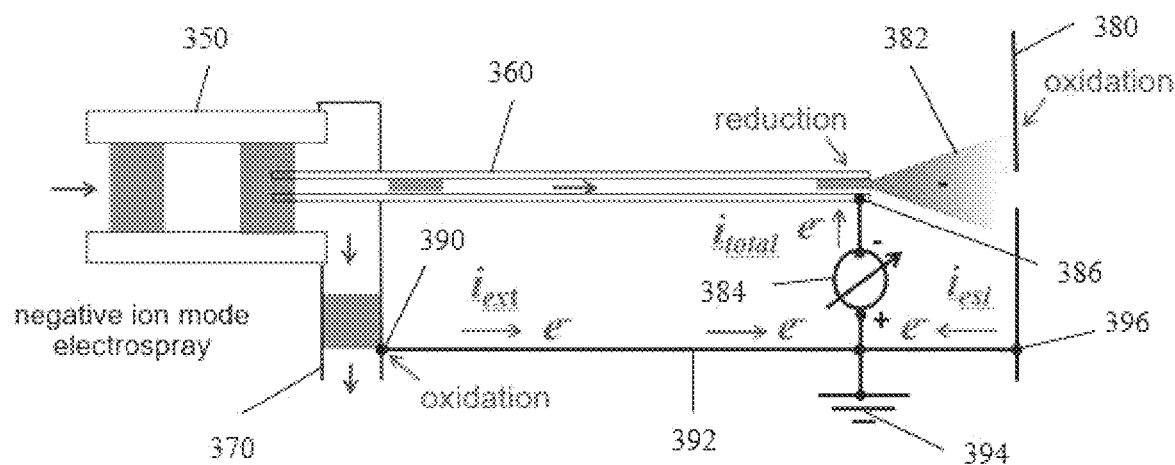
Figure 12A:
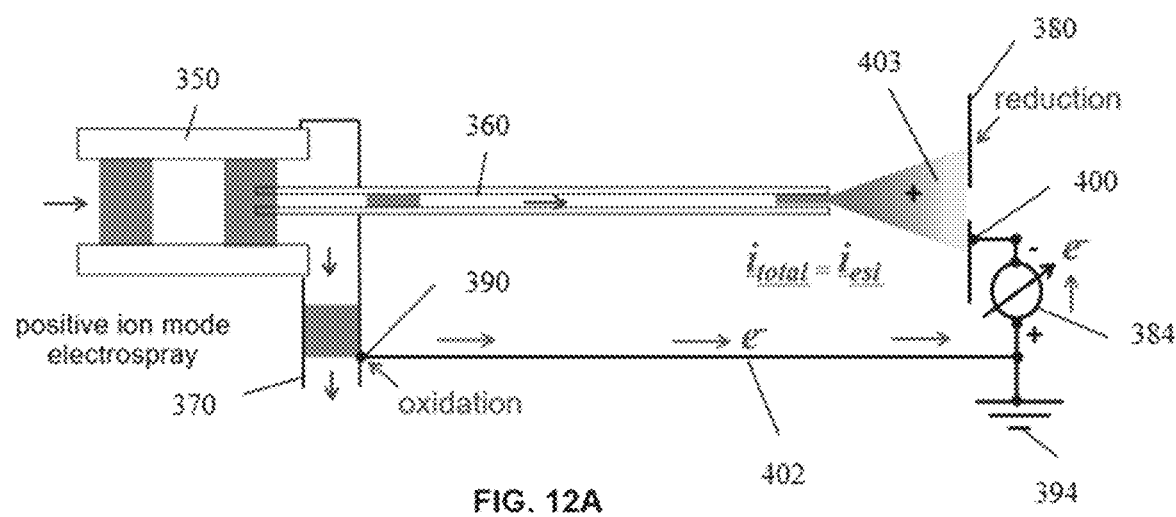
FIGS. 12A and 12B are schematic illustrations of a second circuit connection system according to the invention for a system for sampling operating in positive ion mode electrospray (FIG. 12A) and negative ion mode electrospray (FIG. 12B).
Figure 12B:
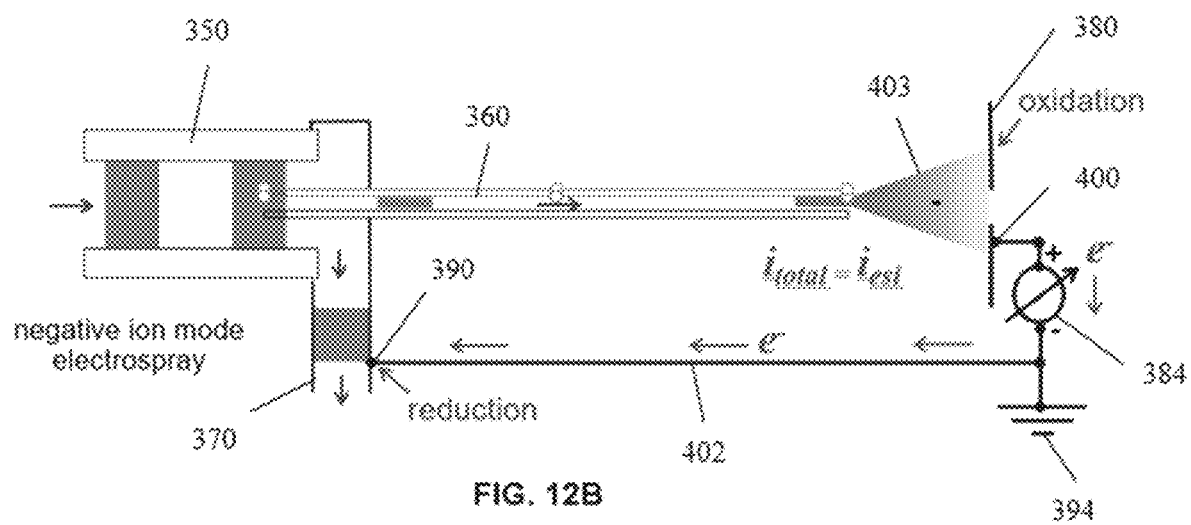

FIG. 11 is a schematic illustration of a first circuit connection system according to the invention ion positive ion mode electrospray (FIG. 11A) and negative ion mode electrospray (FIG. 12B). In positive ion mode electrospray (FIG. 11A), a voltage source 384 is connected to the electrospray outlet at a connection 386 and to a ground 394. An electrical connection 392 is connected to an electrical contact 390 at the sampling fluid exhaust outlet 370 and another electrical contact 396 is made at the electrode 380. In negative ion mode electrospray (FIG. 11B) the polarity of the voltage source 384 is reversed. Positive or negative electrospray 382 is thereby provided.

FIG. 12 is a schematic illustration of a second circuit connection system according to the invention ion positive ion mode electrospray (FIG. 12A) and negative ion mode electrospray (FIG. 12B). In this orientation, the voltage source 384 is connected to the electrode 380 at an electrical contact 400 and to the ground 394. An electrical connection 402 connects between electrical contact 390 at the sampling fluid exhaust outlet 370 and the positive side of voltage source 384. In negative ion mode electrospray (FIG. 12B) the polarity of the voltage source 384 is reversed. Positive or negative electrospray 403 is thereby provided.

Figure 13:
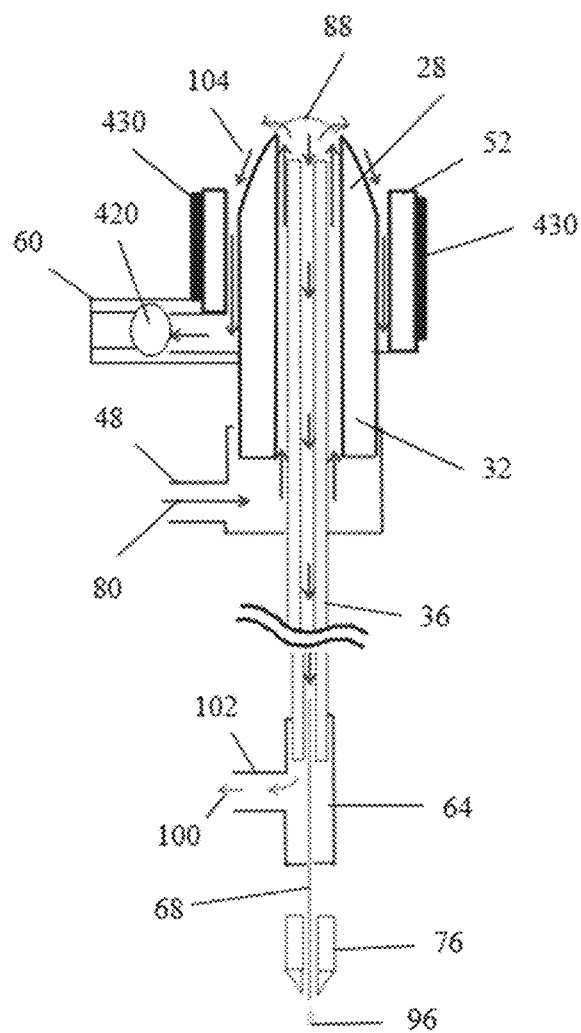
FIG. 13 is a schematic diagram of a system for sampling with a sampling fluid analytic conduit and a wash conduit.
Figure 14:
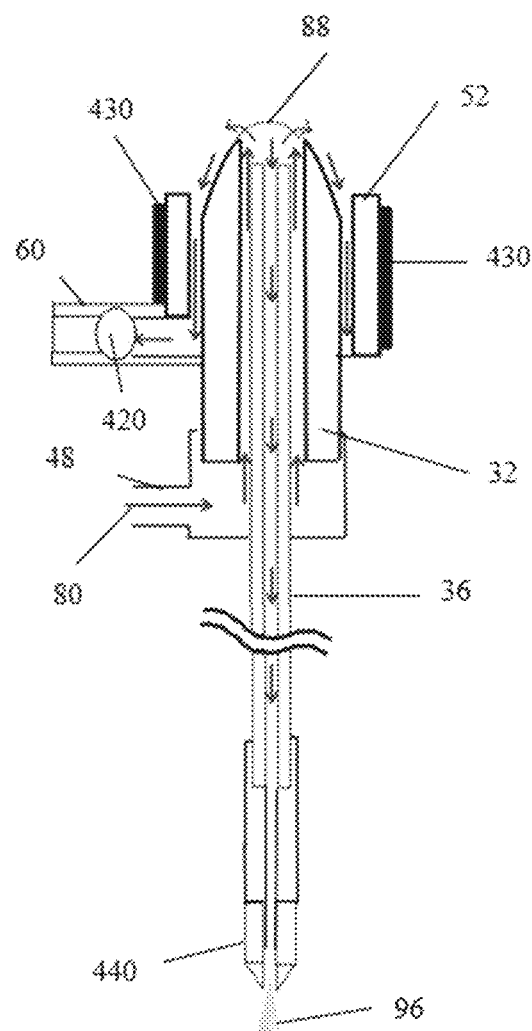
FIG. 14 is a schematic diagram of a system for sampling with a wash conduit.

FIG. 13 is a schematic diagram of a system for sampling shown in FIGS. 1-2, where like numbers refer to like elements, but with a source of vacuum source to draw the overflow fluid 104 into the wash conduit 52. A pump or other vacuum source shown schematically as 420 is provided. The application of a vacuum to the wash conduit 420 will enable the withdrawal of overflow liquid from the probe without spillage in any orientation of the probe with respect to gravity. The overflowing sampling fluid will be drawn into the sample conduit 52 to prevent the sampling fluid from dripping or flowing away from the probe. Heating elements 430 can be provided to prevent the formation of condensation on exterior walls of the wash conduit 52. There is shown in FIG. 14 and embodiment is similar to that in FIG. 13, but without the sampling fluid analytic conduit 68 and an electrospray nozzle 440.

This invention can be embodied in other forms without departing from the spirit or essential attributes thereof. Reference should therefore be made to the following claims to determine the scope of the invention.

I claim:

1. A sampling system comprising:
    a sampling probe comprising:
        a housing, the housing having a probe end with a sampling fluid opening, a sampling fluid supply conduit and a sampling fluid exhaust conduit, the sampling fluid supply conduit supplying sampling fluid to the sampling fluid opening, the sampling fluid exhaust conduit comprising a wall, a sampling fluid exhaust conduit inlet opening for removing sampling fluid from the sampling fluid opening, and a sampling fluid exhaust conduit outlet opening for removing fluid from the sampling fluid exhaust conduit;
        a sampling fluid analytic conduit, the sampling fluid analytic conduit having a sampling fluid analytic conduit inlet opening spaced upstream from the sampling fluid exhaust conduit outlet opening, downstream from the sampling fluid exhaust conduit inlet opening, and from the wall, fluid flowing through the sampling fluid exhaust conduit having a flow axis at the sampling fluid analytic conduit inlet opening that is parallel to a flow axis of fluid flowing through the sampling fluid analytic conduit inlet opening, the sampling fluid analytic conduit inlet opening and being spaced from the wall of the sampling fluid exhaust conduit; and,
    the system further comprising at least one pump for continuously moving sampling fluid through the sampling fluid supply conduit to the sampling fluid opening, and through the sampling fluid exhaust conduit, and at least one analytic conduit pump for moving sampling fluid through the sampling fluid analytic conduit, a portion of the sampling fluid exiting the sampling fluid opening to wash the probe end, and a portion of the sampling fluid exiting the probe through the sampling fluid analytic conduit, and wherein a relationship between a volumetric flow rate of sampling fluid flowing through the sampling fluid exhaust conduit (VFE), a volumetric flow rate of sampling fluid flowing through the sampling fluid analytic conduit (VFA), the inside diameter of the sampling fluid exhaust conduit (DE), and the inside diameter of the sampling fluid analytic conduit (DA) is:

$$D_A = D_E \sqrt{VF_A/VF_E}$$

2. The system of claim 1, wherein the volumetric flow rate of sampling fluid through the sampling fluid analytic conduit is from 0.0001% to 100% of the volumetric flow rate of sampling fluid through the sampling fluid exhaust conduit.

3. The system of claim 1, wherein the sampling fluid analytic conduit and the sampling fluid exhaust conduit have an inside diameter, and the inside diameter of the sampling fluid analytic conduit is from 0.2% to 100% of the inside diameter of the sampling fluid exhaust conduit.

4. The system of claim 1, wherein a plug width of sampling fluid flowing through the sampling fluid analytic conduit is from 0.2% to 100% of a plug width of sampling fluid flowing through the sampling fluid exhaust conduit.

5. The system of claim 1, wherein the sampling fluid supply conduit and the sampling fluid exhaust conduit are coaxial.

6. The system of claim 1, wherein the sampling fluid exhaust conduit and the sampling fluid analytic conduit are coaxial.

7. The system of claim 1, wherein the sampling fluid supply conduit and the sampling fluid exhaust conduit are co-linear.

8. The system of claim 1, wherein the sampling fluid supply conduit and the sampling fluid exhaust conduit are acute.

9. The system of claim 1, wherein the sampling fluid supply conduit and the sampling fluid exhaust conduit are transverse.

10. The system of claim 1, further comprising a wash fluid collection conduit, the wash fluid collection conduit having a wash fluid inlet opening and a wash fluid outlet opening, a portion of the sampling fluid overflowing the probe end and entering the wash fluid collection conduit, the overflowing sampling fluid washing the distal end of at least one of the sampling fluid supply conduit and the sampling fluid exhaust conduit; the at least one pump moving sampling fluid through the wash fluid collection conduit and out of the wash fluid outlet opening.

11. The system of claim 10, further comprising a heater for heating the wash fluid collection conduit to prevent the formation of condensation on exterior walls of the wash fluid collection conduit.

12. The system of claim 1, wherein the sampling fluid analytic conduit is in fluid communication with a sampling fluid analytic pump.

13. The system of claim 12, further comprising a conductive electrospray entrance, the electrospray entrance comprising an electrode for applying a voltage from a voltage source to the electrospray electrode.

14. The system of claim 1, wherein the sampling fluid analytic conduit comprises a non-conductive outlet portion.

15. The system of claim 14, wherein the non-conductive outlet portion comprises an electrode for applying a voltage from a voltage source to sampling fluid flowing through the outlet portion.

16. A method for sampling a sample, comprising the steps of:

providing a sampling probe comprising:
a housing having a probe end with a sampling fluid opening, a sampling fluid supply conduit and a sampling fluid exhaust conduit, the sampling fluid supply conduit supplying sampling fluid to the sampling fluid opening, the sampling fluid exhaust conduit comprising a wall and a sampling fluid exhaust conduit inlet opening for removing sampling fluid from the sampling fluid opening and a sampling fluid exhaust conduit outlet opening for removing sampling fluid from the sampling fluid exhaust conduit;

a sampling fluid analytic conduit, the sampling fluid analytic conduit having an sampling fluid analytic conduit inlet opening spaced upstream from the sampling fluid exhaust conduit outlet opening and downstream from the sampling fluid exhaust conduit inlet opening, fluid flowing through the sampling fluid exhaust conduit having a flow axis at the sampling fluid analytic conduit inlet opening that is parallel to a flow axis of fluid flowing through the sampling fluid analytic conduit inlet opening, the sampling fluid analytic conduit inlet opening and being spaced from the wall of the sampling fluid exhaust conduit; and, the method further comprising the step of moving sampling fluid through the sampling fluid supply conduit to the sampling fluid opening, through the sampling fluid exhaust conduit, and the sampling fluid analytic conduit, a portion of the sampling fluid at the sampling fluid opening contacting the sample, a portion of the sampling fluid exiting the sampling fluid opening to wash the probe end, and a portion of the sampling fluid exiting the probe through the sampling fluid analytic conduit, and wherein a relationship between a volumetric flow rate of sampling fluid flowing through the sampling fluid exhaust conduit (VFE), a volumetric flow rate of sampling fluid flowing through the sampling fluid analytic conduit (VFA), the inside diameter of the sampling fluid exhaust conduit (DE), and the inside diameter of the sampling fluid analytic conduit (DA) is:

$$D_A = D_E \sqrt{VF_A/VF_E}$$

17. The method of claim 16, wherein the sampling fluid flowing through the sampling fluid analytic conduit is isokinetic with the sampling fluid flowing though the sampling fluid exhaust conduit.

* * * * *